(12) United States Patent
Noguchi

(10) Patent No.: US 10,588,274 B2
(45) Date of Patent: Mar. 17, 2020

(54) EMITTER AND DRIP IRRIGATION TUBE

(71) Applicant: Enplas Corporation, Saitama (JP)

(72) Inventor: Koji Noguchi, Saitama (JP)

(73) Assignee: Enplas Corporation, Saitama (JP)

( * ) Notice: Subject to any disclaimer, the term of this patent is extended or adjusted under 35 U.S.C. 154(b) by 156 days.

(21) Appl. No.: 15/577,567

(22) PCT Filed: May 17, 2016

(86) PCT No.: PCT/JP2016/064596
§ 371 (c)(1),
(2) Date: Nov. 28, 2017

(87) PCT Pub. No.: WO2016/194603
PCT Pub. Date: Dec. 8, 2016

(65) Prior Publication Data
US 2018/0168117 A1   Jun. 21, 2018

(30) Foreign Application Priority Data

May 29, 2015   (JP) .................................. 2015-110554

(51) Int. Cl.
*A01G 25/02* (2006.01)
*A01G 25/16* (2006.01)
*B05B 1/20* (2006.01)

(52) U.S. Cl.
CPC ........... *A01G 25/023* (2013.01); *A01G 25/02* (2013.01); *A01G 25/16* (2013.01); *B05B 1/202* (2013.01); *Y02A 40/237* (2018.01)

(58) Field of Classification Search
CPC .... A01G 25/02; A01G 25/023; A01G 25/026; A01G 25/06; A01G 2025/006; A01G 25/16; Y02A 40/237; B05B 1/202
(Continued)

(56) References Cited

U.S. PATENT DOCUMENTS 5,615,838 A * 4/1997 Eckstein ............. A01G 25/023
239/533.1
6,027,048 A   2/2000 Mehoudar
(Continued)

FOREIGN PATENT DOCUMENTS

JP   2010-046094 A   3/2010
JP   2015-62369 A    4/2015

OTHER PUBLICATIONS

Extended European Search Report for 16803038.5 dated Dec. 5, 2018.
(Continued)

*Primary Examiner* — Cody J Lieuwen
(74) *Attorney, Agent, or Firm* — Brundidge & Stanger, P.C.

(57) ABSTRACT

This emitter (120) comprises, downstream of a first pressure reducing flow path, a discharge amount adjustment part and a discharge part. The discharge amount adjustment part communicates with the discharge part via two flow paths: a first hole (173); and a communication flow path including a second hole (174) and a second pressure reducing flow path. An irrigation liquid is supplied directly to the discharge part from the discharge amount adjustment part through the first hole (173) when the external liquid pressure is low, and supplied to the discharge part from the discharge amount adjustment part through the second hole (174) and the second pressure reducing flow path when the external liquid pressure is high.

6 Claims, 11 Drawing Sheets

(58) Field of Classification Search
USPC .......................................................... 239/542
See application file for complete search history.

(56) References Cited

U.S. PATENT DOCUMENTS

| | | | | |
|---|---|---|---|---|
| 8,511,585 | B2* | 8/2013 | Keren | A01G 25/023 |
| | | | | 239/542 |
| 8,998,112 | B2* | 4/2015 | Cohen | A01G 25/023 |
| | | | | 239/542 |
| 2002/0070297 | A1* | 6/2002 | Bolinis | A01G 25/023 |
| | | | | 239/542 |
| 2003/0092817 | A1* | 5/2003 | Ruskin | A01G 25/02 |
| | | | | 524/445 |
| 2009/0173811 | A1* | 7/2009 | Gorney | A01G 25/023 |
| | | | | 239/542 |
| 2009/0266919 | A1* | 10/2009 | Mavrakis | A01G 25/023 |
| | | | | 239/542 |
| 2010/0282873 | A1* | 11/2010 | Mattlin | A01G 25/023 |
| | | | | 239/542 |
| 2013/0248616 | A1* | 9/2013 | Ensworth | A01G 25/026 |
| | | | | 239/11 |
| 2014/0246520 | A1* | 9/2014 | Einav | A01G 25/023 |
| | | | | 239/542 |

OTHER PUBLICATIONS

International Search Report from International Application No. PCT/JP2016/064596 dated Jul. 26, 2016.

* cited by examiner

EMITTER AND DRIP IRRIGATION TUBE

TECHNICAL FIELD

The present invention relates to an emitter and a drip irrigation tube including the emitter.

BACKGROUND ART

Conventionally, a drip irrigation method is known as a method for culturing plants. In the drip irrigation method, a drip irrigation tube is disposed on the soil where plants are planted, and irrigation liquid such as water and liquid fertilizer is dropped from the drip irrigation tube to the soil. The drip irrigation method has been increasingly attracting attention in recent years since the method can minimize the consumption rate of the irrigation liquid.

Normally, the drip irrigation tube includes a tube in which a plurality of through holes for discharging irrigation liquid are formed, and a plurality of emitters (also called "drippers") for discharging irrigation liquid from respective through holes. In addition, as the emitter, emitters which are joined on the inner wall surface of the tube (see, for example, PTL 1), and emitters which are inserted to the tube from the exterior of the tube are known.

PTL 1 discloses an emitter configured to be joined on the inner wall surface of a tube. The emitter disclosed in PTL 1 includes a first member including a water intake port for intake of irrigation liquid, a second member including an outlet for discharging the irrigation liquid, and a film member disposed between the first member and the second member. On the inside of the first member, a valve seat part disposed to surround the water intake port and a pressure reducing groove that serves as a part of a pressure reduction channel are formed. In the film member, a through hole is formed at a position corresponding to the downstream end of the pressure reducing groove.

When the first member, the film member and the second member are stacked, the pressure reduction channel is formed, and the film member makes contact with the valve seat part to close the water intake port. In addition, a channel for carrying the irrigation liquid from the water intake port to the outlet is formed.

In the emitter disclosed in PTL 1, when the pressure of the irrigation liquid in the tube is equal to or greater than a predetermined pressure, the film member closing the water intake port is pushed by the irrigation liquid, and the irrigation liquid flows into the emitter. The pressure of the irrigation liquid proceeded into the emitter is reduced by the reduction channel, and the irrigation liquid is quantitatively discharged from the outlet.

CITATION LIST

Patent Literature

PTL 1
Japanese Patent Application Laid-Open No. 2010-046094

SUMMARY OF INVENTION

Technical Problem

In the drip irrigation tube using the emitter disclosed in PTL 1, however, the irrigation liquid flows into the emitter only when the pressure of the irrigation liquid in the tube is equal to or greater than the predetermined pressure. As a result, in some situation, the emitters do not function when the pressure of the irrigation liquid in the tube is significantly low. Consequently, there is a possibility that emitters disposed at a position remote from the liquid feed pump for sending the irrigation liquid to the tube do not appropriately function while emitters in a region near the liquid feed pump appropriately function. Accordingly, the discharge rate of the irrigation liquid from the emitters can vary depending on the watering positions, thus limiting the watering distance.

In addition, in the emitter disclosed in PTL 1, when the pressure of the irrigation liquid further increases from the predetermined pressure, the discharge rate of the irrigation liquid also increases, and the discharge rate of the irrigation liquid from the emitter exceeds the desired flow rate in some situation. In view of this, the emitter disclosed in PTL 1 has a room for improvement in terms of the control of the discharge rate when the pressure of the irrigation liquid is high.

An object of the present invention is to provide an emitter and a drip irrigation tube which can control the discharge rate of irrigation liquid regardless of whether the pressure is low or high.

Solution to Problem

Embodiments of the present invention provide an emitter configured to be joined on an inner wall surface of a tube for carrying irrigation liquid at a position corresponding to a discharging port communicating between inside and outside of the tube, the emitter being configured to quantitatively discharge the irrigation liquid in the tube from the discharging port to the outside of the tube, the emitter including: a water intake part for intake of the irrigation liquid in the tube; a first pressure reduction channel part for forming a first pressure reduction channel configured to allow the irrigation liquid received at the water intake part to flow therethrough while reducing a pressure of the irrigation liquid received at the water intake part; a discharge rate adjusting part for controlling a flow rate of the irrigation liquid supplied from the first pressure reduction channel in accordance with a pressure of the irrigation liquid in the tube; a discharging part for housing the irrigation liquid supplied from the discharge rate adjusting part, the discharging part being configured to face the discharging port; and a communication channel part configured to communicate between the discharge rate adjusting part and the discharging part. The discharge rate adjusting part includes a recess, a film having flexibility, the film being disposed such that the film is separated from the recess and is capable of making close contact with the recess when the pressure of the irrigation liquid in the tube is equal to or greater than a set value, a supply port communicated with the first pressure reduction channel part and configured to supply the irrigation liquid to the recess, a first hole opening at the recess and the discharging part and configured to be sealed with the film when the film makes close contact with the recess, and a second hole opening at the communication channel part and at a position where the second hole is communicated with the supply port when the film seals the first hole, and the communication channel part includes a second pressure reduction channel part for forming a second pressure reduction channel configured to allow the irrigation liquid to flow therethrough while reducing the pressure of the irrigation liquid.

In addition, embodiments of the present invention provide a drip irrigation tube including: the tube including the discharging port for discharging irrigation liquid; and the emitter joined on the inner wall surface of the tube at a position corresponding to the discharging port.

Advantageous Effects of Invention

According to the present invention, it is possible to provide an emitter and a drip irrigation tube which control the discharge rate of irrigation liquid regardless of whether the pressure is low or high.

DESCRIPTION OF EMBODIMENTS

First Embodiment

A first embodiment of the present invention is described below in detail with reference to the accompanying drawings.

Figure 1A:
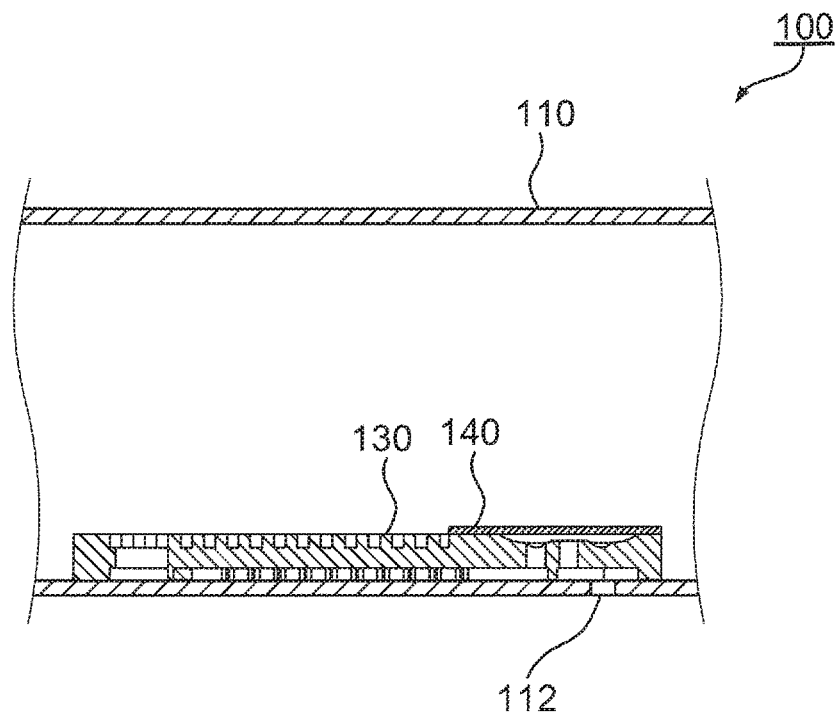
FIG. 1A is a sectional view in a direction along the axis of a drip irrigation tube according to a first embodiment of the present invention.
Figure 1B:
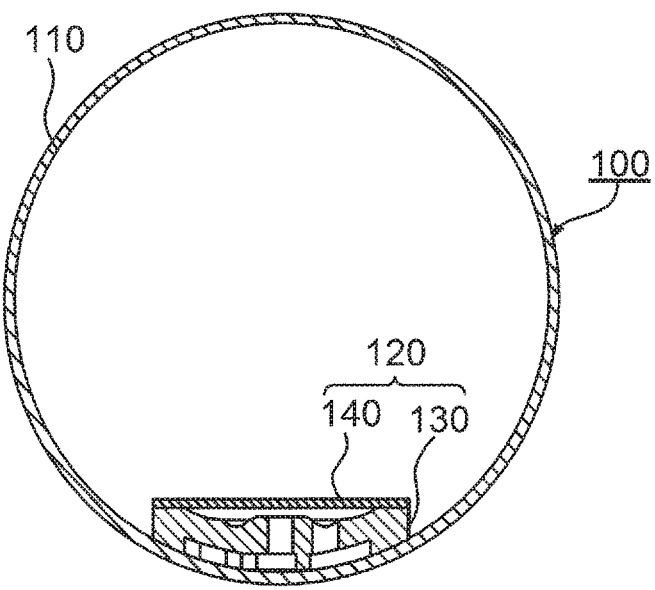
FIG. 1B is a sectional view in a direction perpendicular to the axis of the drip irrigation tube.

FIG. 1A is a sectional view along the axial direction of drip irrigation tube 100 according to the first embodiment of the present invention, and FIG. 1B is a sectional view in a direction perpendicular to the axis of drip irrigation tube 100. As illustrated in FIG. 1A and FIG. 1B, drip irrigation tube 100 includes tube 110 and emitter 120.

Tube 110 is a pipe for carrying irrigation liquid. The material of tube 110 is not limited. In the present embodiment, the material of tube 110 is polyethylene. The cross-sectional shape and the cross-sectional area of tube 110 in the direction perpendicular to the axis direction can be appropriately set as long as emitter 120 can be installed inside tube 110. In the wall of tube 110, a plurality of discharging ports 112 for discharging irrigation liquid are formed at a predetermined interval (for example, 200 to 500 mm) in the axis direction of tube 110. The diameter of the edge of discharging port 112 can be appropriately set as long as the irrigation liquid can be discharged at a desired flow rate, and is, for example, 1.5 mm. Emitters 120 are joined at respective positions corresponding to discharging ports 112 of the inner wall surface of tube 110.

Emitter 120 is joined on the inner wall surface of tube 110 at the convex surface of emitter main body 130. Emitter 120 is joined to tube 110 by a publicly known method for example, and the examples of the way of joining emitter 120 to tube 110 include welding and/or fusing of a resin material of emitter 120 or tube 110, and bonding with an adhesive agent. Normally, discharging port 112 is formed after tube 110 and emitter 120 are joined to each other, and discharging port 112 may be formed before tube 110 and emitter 120 are joined to each other.

Figure 2A:
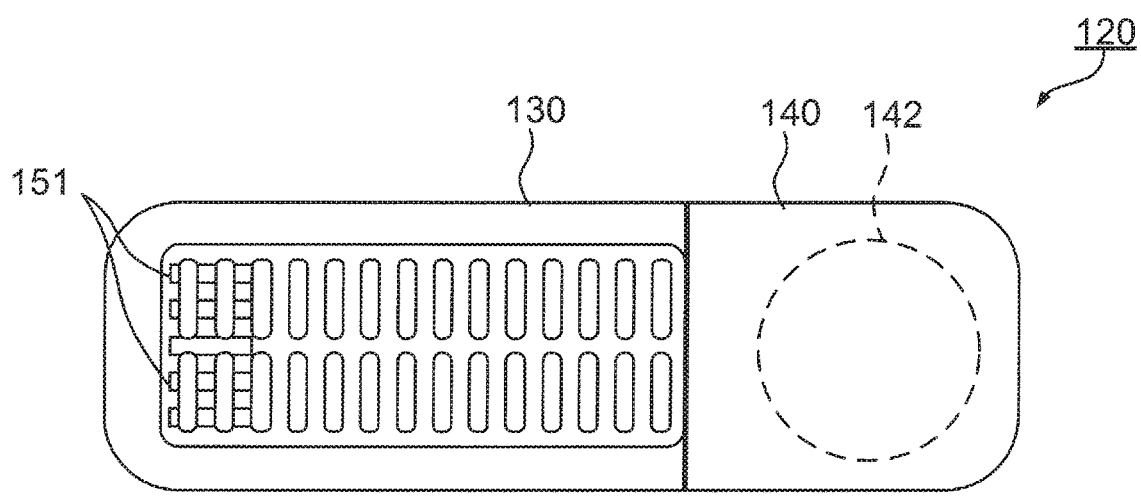
FIG. 2A is a plan view of the emitter according to the first embodiment.
Figure 2B:
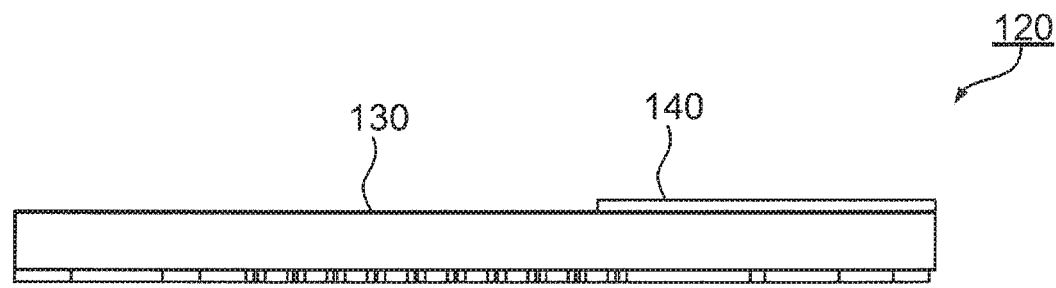
FIG. 2B is a front view of the emitter.
Figure 2C:
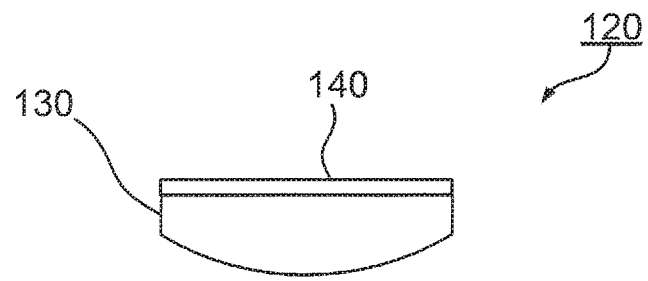
FIG. 2C is a right side view of the emitter.

FIG. 2A is a plan view of emitter 120, FIG. 2B is a front view of emitter 120, and FIG. 2C is a right side view of emitter 120. As illustrated in FIG. 2A to FIG. 2C, emitter 120 includes emitter main body 130, and film 140. Emitter main body 130 is composed of the above-mentioned convex surface (which is referred to also as "bottom surface") matching the inner wall surface of tube 110, a plane surface (which is referred to also as "top surface") located on the side opposite to the bottom surface, and recesses and through holes appropriately formed in these surfaces.

The size and the shape of emitter 120 can be appropriately set as long as a desired function can be ensured. For example, the planar shape of emitter 120 is a substantially rectangular shape with chamfered four corners, and emitter 120 has a long side length of 25 mm, a short side length of 8 mm, and a height of 2.5 mm.

Figure 3A:
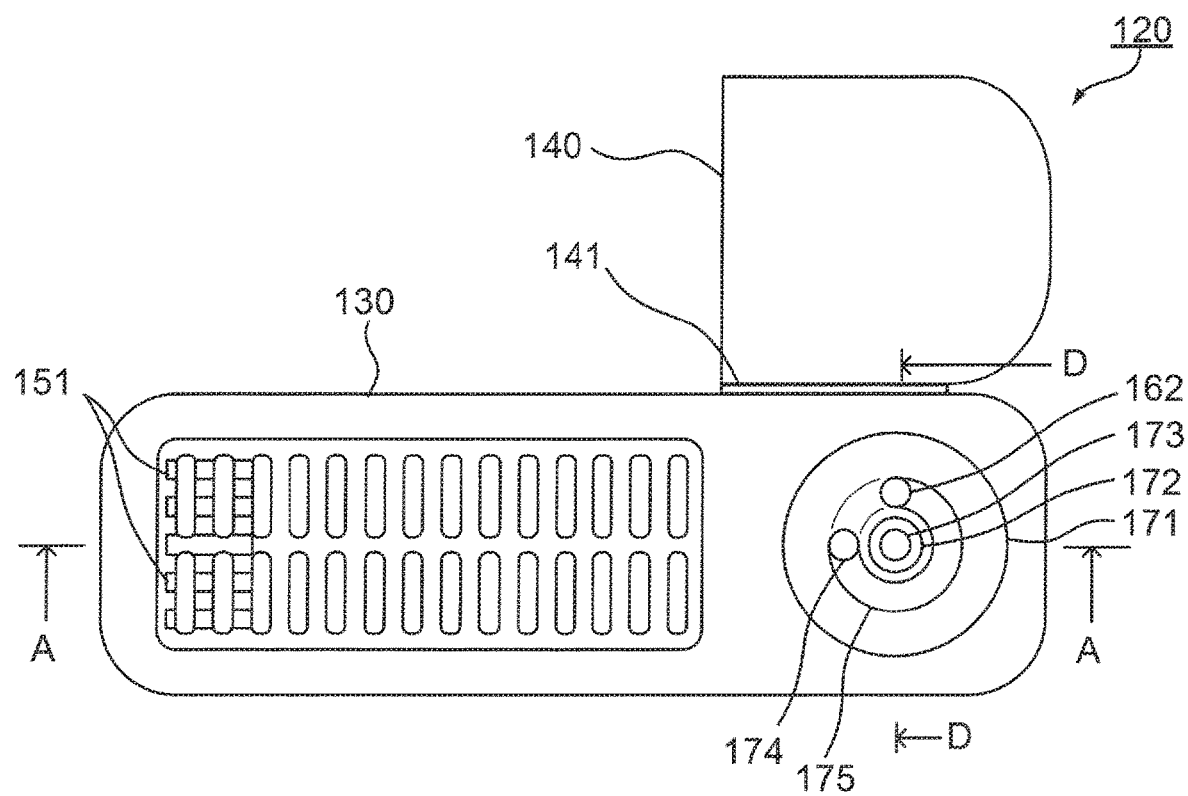
FIG. 3A is a plan view of the emitter according to the first embodiment before a film is joined.
Figure 3B:
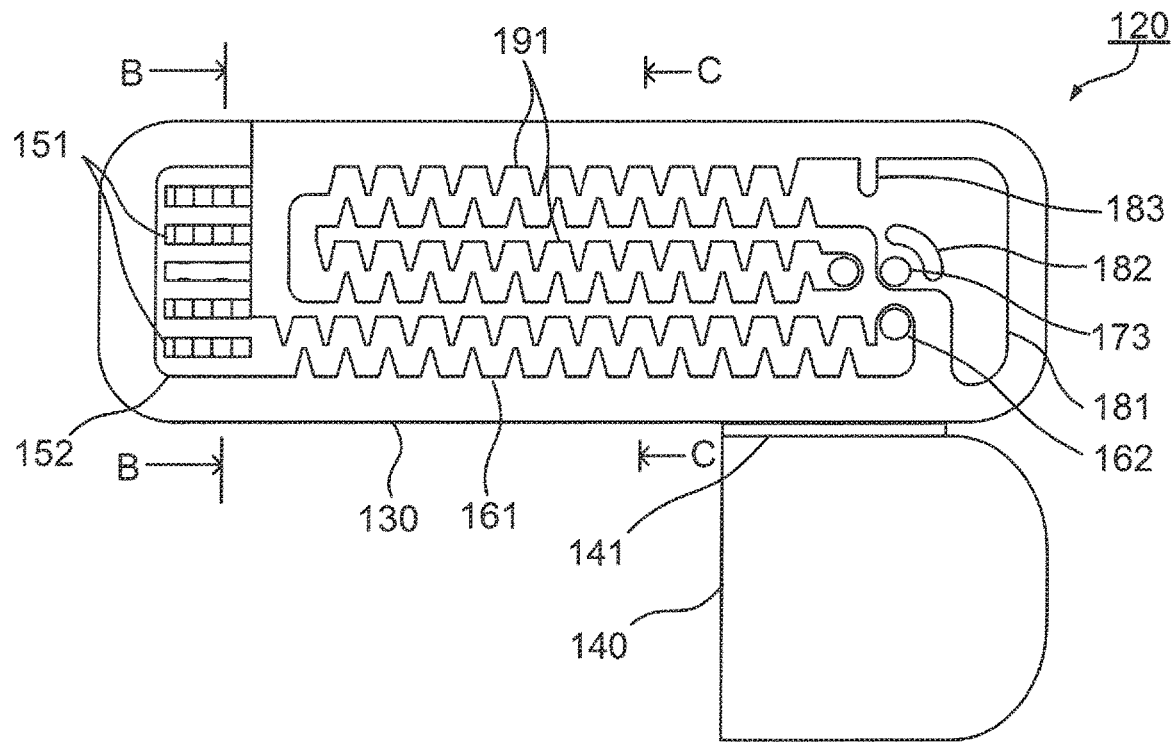
FIG. 3B is a bottom view of the emitter before the film is joined.
Figure 4A:
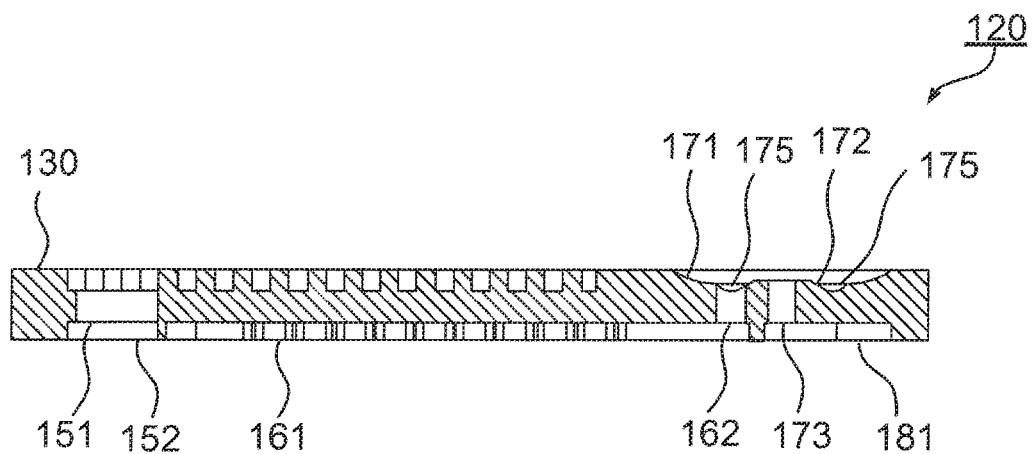
FIG. 4A is a cross-sectional view of the emitter main body of the first embodiment taken along line A-A of FIG. 3A.
Figure 4B:
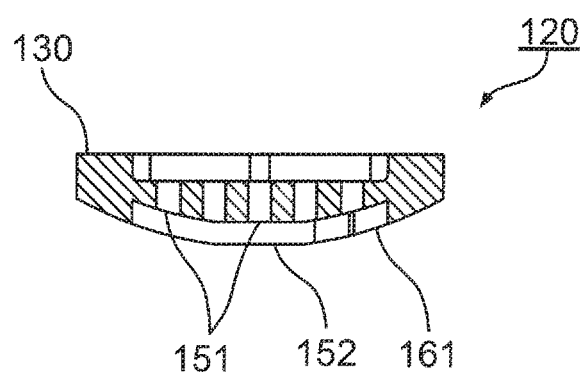
FIG. 4B is a cross-sectional view of the emitter main body taken along line B-B of FIG. 3B.
Figure 5A:
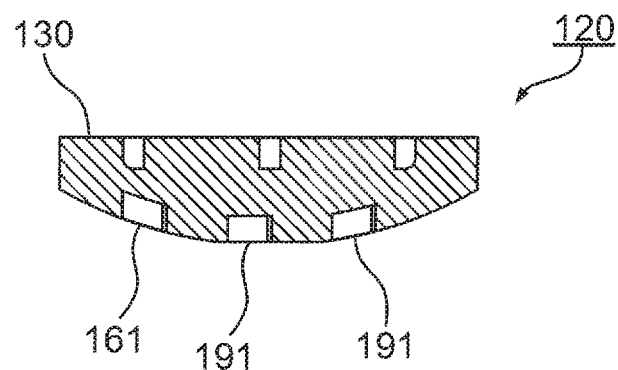
FIG. 5A is a cross-sectional view of the emitter main body of the first embodiment taken along line C-C of FIG. 3B.
Figure 5B:
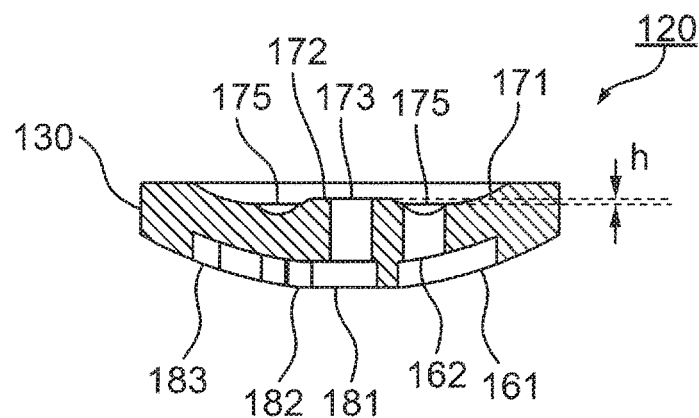
FIG. 5B is a cross-sectional view of the emitter main body taken along line D-D of FIG. 3A.

FIG. 3A is a plan view of emitter 120 before the joining of film 140, and FIG. 3B is a bottom view of emitter 120 before the joining of film 140. In addition, FIG. 4A is a cross-sectional view of emitter main body 130 taken along line A-A of FIG. 3A, and FIG. 4B is a cross-sectional view of emitter main body 130 taken along line B-B of FIG. 3B. Further, FIG. 5A is a cross-sectional view of emitter main body 130 taken along line C-C of FIG. 3B, and FIG. 5B is a cross-sectional view of emitter main body 130 taken along line D-D of FIG. 3A.

Emitter 120 is integrally molded with a resin material having flexibility as illustrated in FIG. 3A and FIG. 3B. For example, film 140 is disposed integrally with emitter main body 130 through hinge part 141 at a side edge of emitter main body 130. When turned about hinge part 141, film 140 is disposed at a position so as to cover the discharge rate adjusting part. The thickness of film 140 is, for example 0.3 mm.

The integrally molded product of emitter main body 130 and film 140 is produced by injection molding, for example.

The resin material is a resin material having a desired flexibility when emitter main body 130 and film 140 are molded, and the examples of the material include polyethylene, polypropylene and silicone. In addition, the resin material may be an industrial material having rubber elasticity, and the examples of the material include elastomer and rubber.

Emitter main body 130 includes a water intake part for intake of the irrigation liquid in tube 110, first pressure reduction channel part 161 for forming a first pressure reduction channel that allows the irrigation liquid received from the water intake part to flow therethrough while reducing the pressure of the irrigation liquid, a discharge rate adjusting part for controlling the flow rate of the irrigation liquid supplied from the first pressure reduction channel in accordance with the pressure of the irrigation liquid in tube 110 (which is also referred to simply as "outer liquid pressure"), a discharging part configured to house the irrigation liquid supplied from the discharge rate adjusting part and face discharging port 112, and a communication channel part that communicates between the discharge rate adjusting part and the discharging part.

The water intake part includes a screen part, water intake slit 151 to which the irrigation liquid past the screen part is supplied, and recess 152 for forming a part of a channel of the irrigation liquid in emitter 120, which houses the irrigation liquid past water intake slit 151.

The screen part is minute recesses and projections formed in the top surface, and, roughly speaking, includes first grooves disposed along the longitudinal direction at a center portion and both side portions of emitter main body 130 in plan view, and a plurality of second grooves disposed along the short direction of emitter main body 130 in parallel with each other so as to communicate between the first grooves of the both side portions and the first groove of the center portion. A plurality of slender projections sectioned by the second grooves and extending along the short direction are formed in parallel with each other in the longitudinal direction between the first grooves of the center portion and the both side portions. The corners of the planar shape of each projection are appropriately chamfered.

A plurality of water intake slits 151 are disposed on one end side in emitter main body 130 in parallel with each other in the short direction of emitter main body 130. Each water intake slit 151 is formed along the longitudinal direction across the second grooves, and opens to the second grooves.

Recess 152 is formed on one end side in the bottom surface of emitter main body 130, and has a substantially rectangular slender shape along the short direction in plan view. Water intake slits 151 open at the bottom of recess 152. That is, water intake slits 151 communicate between the second grooves and recess 152.

First pressure reduction channel part 161 is continuously connected with recess 152. First pressure reduction channel part 161 is a groove having a zigzag shape in plan view which is formed in one side part of the bottom surface. The zigzag shape is a shape in which projections, each having a nearly triangular prism shape, are alternately disposed along the longitudinal direction from the side surfaces of first pressure reduction channel part 161, for example. In plan view, the projections are disposed such that the tip of each projection does not exceed the central axis between the side surfaces. For example, the length of first pressure reduction channel part 161 is 14.5 mm, the depth of first pressure reduction channel part 161 is 0.5 mm, and the width of the channel of first pressure reduction channel part 161 (the distance between opposite side surfaces at opposite projections) is 0.5 mm. Hole 162 opens at an end of first pressure reduction channel part 161.

The discharge rate adjusting part includes cone-shaped recess 171 formed on the top surface. Recess 171 includes valve seat part 172 disposed at a center portion of recess 171. Valve seat part 172 is a portion of a truncated cone shape slightly raised from the bottom surface of recess 171. The height of valve seat part 172 from the bottom surface of recess 171 ("h" in FIG. 5B) is, for example, 0.1 mm.

First hole 173 is formed at a center portion of valve seat part 172. Hole 162, second hole 174, and groove 175 configured to directly communicate hole 162 and second hole 174 are formed around valve seat part 172.

Hole 162 is communicated with first pressure reduction channel part 161.

Accordingly, hole 162 corresponds to a supply port for supplying irrigation liquid to recess 171. Hole 162 and second hole 174 open at respective positions on a circle around the edge of first hole 173. To be more specific, when hole 162 is located at 12 o'clock position, second hole 174 opens at 9 o'clock position.

Groove 175 extends clockwise from hole 162 to second hole 174 along a circle that passes through hole 162 and second hole 174 around the edge of first hole 173. That is, in plan view of the discharge rate adjusting part, the circle includes an arc whose center angle is 90° and an arc whose center angle is 270° between hole 162 and second hole 174, and groove 175 is formed along the arc of 270°. Groove 175 is a round groove, for example. The opening width of groove 175 is identical to the diameter of hole 162 and second hole 174 in recess 171, and is 0.8 mm, for example. In addition, the depth of groove 175 from the bottom surface of recess 171 is 0.2 mm, for example.

The discharging part includes recess 181 formed on the bottom surface of emitter main body 130, and first projection 182 and second projection 183 raised from the bottom surface of recess 181. The planar shape of recess 181 is a three-step shape in which a rectangular portion is provided at the inner corner of an L-shape. First hole 173 opens at the rectangular portion of recess 181. That is, first hole 173 communicates between recess 171 and recess 181.

First projection 182 is disposed in the periphery of the edge of first hole 173 in recess 181, and has an arc shape in plan view. First projection 182 is disposed such that a gap is defined between first projection 182 and the wall of recess 181. Second projection 183 is disposed at an end portion of the step shape in recess 181, and has a linear shape in plan view. Second projection 183 protrudes from one wall of recess 181, and is disposed such that a gap is defined between second projection 183 and another wall facing the one wall.

The communication channel part includes second pressure reduction channel part 191 that communicates between second hole 174 and recess 181. Second pressure reduction channel part 191 is a groove formed on the bottom surface of emitter main body 130, and has a zigzag shape in plan view as with first pressure reduction channel part 161. Second pressure reduction channel part 191 extends from second hole 174 to an end side of emitter main body 130, and then turns and extends to recess 181 on the other end side of emitter main body 130. With this configuration, the length of second pressure reduction channel part 191 is about twice the length of first pressure reduction channel part 161.

Emitter 120 is configured by turning film 140 about the hinge part, and joining the film 140 to the top surface of emitter main body 130. Various publicly-known methods may be employed to join film 140 to emitter main body 130, and the examples of the methods include welding or fusing of film 140, and bonding with an adhesive agent. By joining film 140 to emitter main body 130, film 140 is disposed to seal recess 171 at the upper end edge of recess 171 and separated from valve seat part 172. In the following description, the portion which seals recess 171 in film 140 is referred to also as diaphragm part 142 (see FIG. 2A).

It is to be noted that hinge part 141 may be separated from emitter 120 after film 140 is joined to emitter main body 130. In addition, film 140 and emitter main body 130 may be separate members, and emitter 120 may be configured by joining film 140 and emitter main body 130 separated from each other.

Emitter 120 can be disposed at a predetermined position on the inner wall surface of tube 110 by fusing emitter 120 at a desired position at the time of shaping tube 110, for example. In this manner, drip irrigation tube 100 is configured. When emitter 120 is joined to the inner wall surface of tube 110, the bottom surface of emitter main body 130 is sealed with tube 110. Thus, recess 152 of the water intake part serves as a part of a channel of the irrigation liquid in emitter 120 in which the irrigation liquid past slit 151 is housed.

In addition, first pressure reduction channel part 161 serves as a first pressure reduction channel for carrying the irrigation liquid received at the water intake part to the discharge rate adjusting part while reducing the pressure of the irrigation liquid. In addition, second pressure reduction channel part 191 of the communication channel part serves as the second pressure reduction channel for carrying the irrigation liquid while reducing the pressure of the irrigation liquid, and the communication channel part serves as the communication channel part that communicates between second hole 174 and recess 181.

Further, recess 181 of the discharging part forms a space for housing the irrigation liquid supplied from the discharge rate adjusting part, and first projection 182 and second projection 183 joined to tube 110 at their tops serve as an intrusion preventing part for preventing intrusion of foreign matters into discharging port 112.

Next, flow of irrigation liquid in drip irrigation tube 100 is roughly described. First, irrigation liquid is fed into tube 110. Examples of the irrigation liquid include water, liquid fertilizer, agricultural chemicals and mixtures thereof. The pressure of the irrigation liquid fed to drip irrigation tube 100 is 0.1 MPa or lower in view of simple implementation of the drip irrigation method and prevention of damaging of tube 110 and emitter 120, for example.

The irrigation liquid in tube 110 is supplied into emitter 120 through the first to second grooves of the screen part. Floating matters in the irrigation liquid are captured by the recesses and projections of the screen part, and the irrigation liquid from which such floating matters are removed passes through water intake slit 151.

It is to be noted that, when the recesses and projections are configured in a so-called wedge wire structure by forming the first to second grooves into shapes whose width increases toward the lower side, the liquid pressure drop at the time of intake of irrigation liquid into emitter 120 can be further suppressed.

The irrigation liquid supplied into emitter 120 passes through the first pressure reduction channel of first pressure reduction channel part 161 while its pressure being reduced. Then, the irrigation liquid is supplied to recess 171 of the discharge rate adjusting part through hole 162.

The irrigation liquid supplied from hole 162 to recess 171 is supplied to groove 175, second hole 174 and first hole 173. The irrigation liquid past first hole 173 is directly supplied to recess 181. The irrigation liquid past second hole 174 passes through the second pressure reduction channel while its pressure being reduced, and is then supplied to recess 181.

The irrigation liquid supplied to recess 181 is discharged to the outside of tube 110 from discharging port 112 of tube 110 opening at recess 181.

Figure 6A:
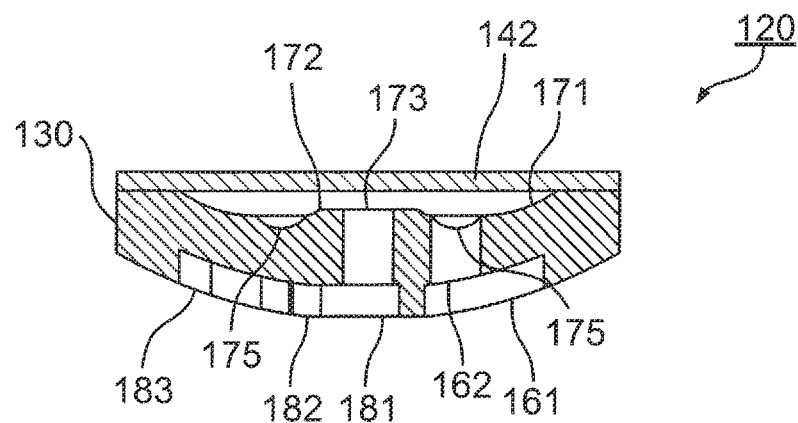
FIG. 6A schematically illustrates a part of a cross section of the emitter according to the first embodiment along line D-D of FIG. 3A in the case where the outer liquid pressure is 0 MPa, FIG. 6B schematically illustrates a part of a cross section of the emitter along line D-D of FIG. 3A in the case where the outer liquid pressure is equal to or greater than a first set value, and FIG. 6C schematically illustrates a part of a cross section of the emitter along line D-D of FIG. 3A in the case where the outer liquid pressure is equal to or greater than a second set value.

Next, adjustment of the flow rate of the irrigation liquid in the discharge rate adjusting part is described in more detail. FIG. 6A schematically illustrates a part of a cross section of emitter 120 along line D-D of FIG. 3A in the case where the outer liquid pressure is 0 MPa, FIG. 6B schematically illustrates a part of a cross section of emitter 120 along line D-D of FIG. 3A in the case where the outer liquid pressure is equal to or greater than a first set value, and FIG. 6C schematically illustrates a part of a cross section of emitter 120 along line D-D of FIG. 3A in the case where the outer liquid pressure is equal to or greater than a second set value.

When the outer liquid pressure increases from 0 MPa illustrated in FIG. 6A, diaphragm part 142 is gradually deflected toward valve seat part 172 side along with the increase in outer liquid pressure. When the outer liquid pressure is lower than the first set value (for example, 0.02 MPa), diaphragm part 142 is separated from valve seat part 172. Accordingly, when the outer liquid pressure is lower than the first set value, the irrigation liquid is supplied to recess 181 through both first hole 173 and second hole 174 as described above. When the outer liquid pressure further increases, the flow rate of the irrigation liquid in the first pressure reduction channel increases, and as a result, the flow rate of the irrigation liquid which is discharged from discharging port 112 increases. The second pressure reduction channel is disposed on the downstream side of second hole 174. Accordingly, due to the pressure drop thereof, the irrigation liquid flows through first hole 173 more than through second hole 174. Thus, first hole 173 is prioritized in discharge of the irrigation liquid in recess 171.

Figure 6B:
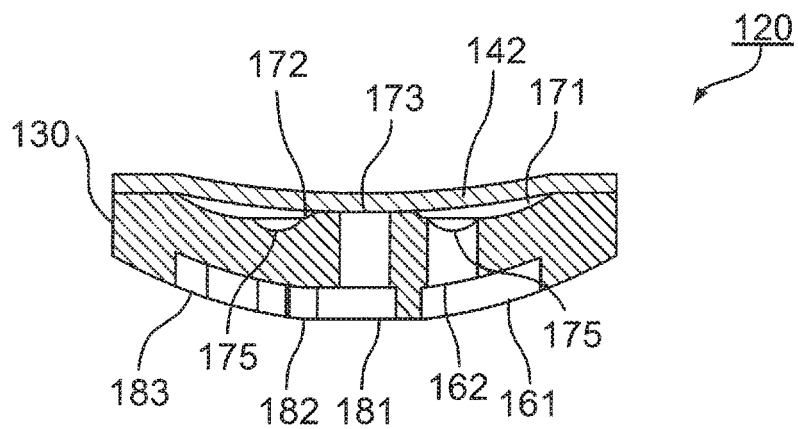
Figure 6C:
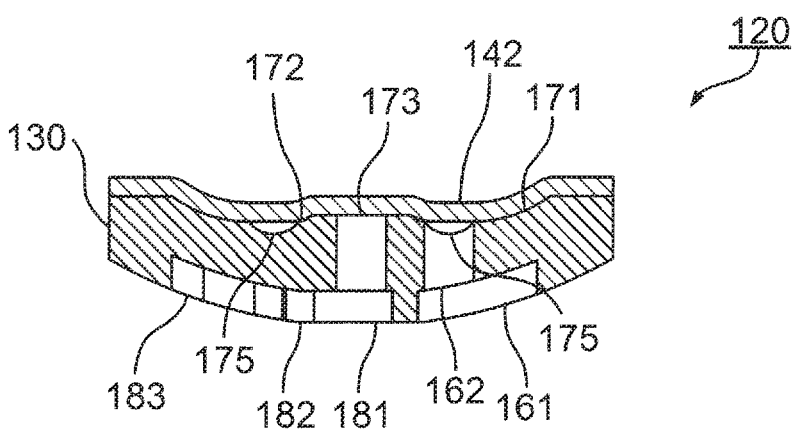

When the outer liquid pressure increases to the first set value, diaphragm part 142 is sufficiently and largely deflected, and, since valve seat part 172 is slightly raised from the bottom surface of recess 171, diaphragm part 142 makes close contact with valve seat part 172 as illustrated in FIG. 6B. Thus first hole 173 is sealed with film 140.

In contrast, groove 175 is recessed further from the bottom surface of recess 171 around valve seat part 172, and therefore hole 162 and second hole 174 are not sealed with diaphragm part 142. With this configuration, hole 162 serves as a supply port for supplying irrigation liquid to recess 171 regardless of the close contact of diaphragm part 142, and second hole 174 opens at a position in recess 171 where second hole 174 is communicated with hole 162 when diaphragm part 142 seals first hole 173. Accordingly, when the outer liquid pressure is equal to or greater than the first set value, supply of irrigation liquid from first hole 173 to recess 181 is stopped, and the irrigation liquid past second hole 174 is supplied to recess 181 through the second pressure reduction channel (second pressure reduction channel part 191) and discharged from discharging port 112.

When the outer liquid pressure further increases from the first set value, the flow rate of the irrigation liquid in the first pressure reduction channel increases, and the flow rate of the irrigation liquid which passes through second hole 174 also gradually increases.

When the outer liquid pressure increases to the second set value (for example, 0.1 MPa), diaphragm part 142 makes close contact also with the bottom surface of recess 171 as illustrated in FIG. 6C, and hole 162 is communicated with second hole 174 only through groove 175. In this manner, when the outer liquid pressure is equal to or greater than the second set value, only groove 175 serves as the channel of the irrigation liquid in the discharge rate adjusting part.

When the outer liquid pressure further increases from the second set value, the pressure of the irrigation liquid inside emitter 120 also increases, and the flow rate of the irrigation liquid further increases. However, the pressure of the irrigation liquid which flows from the discharge rate adjusting part to the communication channel is reduced by the second pressure reduction channel. Accordingly, the increase in discharge rate of the irrigation liquid from discharging port 112 in response to the further increase in outer liquid pressure is further suppressed.

In this manner, when the pressure is low, emitter 120 supplies irrigation liquid directly to the discharging part from the discharge rate adjusting part, and when the pressure is high, emitter 120 supplies the irrigation liquid to the discharging part through the second pressure reduction channel from the discharge rate adjusting part. Thus, emitter 120 can discharge the irrigation liquid at a desired rate regardless of whether the pressure is low or high. The flow rate of the irrigation liquid which proceeds directly to the discharging part from the discharge rate adjusting part can be adjusted by the length of first pressure reduction channel part 161, the clearance of diaphragm part 142 and valve seat part 172, and the like. In addition, the upper limit of the outer liquid pressure for obtaining a desired flow rate can be increased by increasing the length of second pressure reduction channel part 191, reducing the cross-sectional area of groove 175, and the like.

As is clear from the above description, emitter 120 is an emitter that is joined at a position corresponding to discharging port 112 of the inner wall surface of tube 110, and quantitatively discharges the irrigation liquid in tube 110 to the outside of tube 110 from discharging port 112. Emitter 120 includes a water intake part for intake of the irrigation liquid in tube 110, first pressure reduction channel part 161 for forming a first pressure reduction channel that allows the irrigation liquid received at the water intake part while reducing the pressure of the irrigation liquid, a discharge rate adjusting part for controlling the flow rate of the irrigation liquid supplied from the first pressure reduction channel in accordance with the pressure of the irrigation liquid in tube 110, a discharging part configured to house the irrigation liquid supplied from the discharge rate adjusting part and face discharging port 112, and a communication channel part that communicates between the discharge rate adjusting part and the discharging part. Further, the discharge rate adjusting part includes recess 171, film 140 (diaphragm part 142) having flexibility and disposed separately from recess 171 at a position where film 140 is allowed to make close contact with recess 171 when the outer liquid pressure is equal to or greater than a set value, a supply port (hole 162) communicated with first pressure reduction channel part 161 and configured to supply irrigation liquid to the discharge rate adjusting part, first hole 173 opening to recess 171 and the discharging part (recess 181) and configured to be sealed with diaphragm part 142 making close contact with recess 171, and second hole 174 opening at the communication channel part and at a position where hole 174 is communicated with hole 162 when diaphragm part 142 seals first hole 173. In addition, the communication channel part includes second pressure reduction channel part 191 for forming a second pressure reduction channel that allows irrigation liquid to flow therethrough while reducing the pressure of the irrigation liquid. Accordingly, the discharge rate of the irrigation liquid can be controlled regardless of whether the pressure is low or high.

In addition, the configuration in which the discharge rate adjusting part further includes groove 175 formed on the surface of recess 171 and configured to directly communicate hole 162 and second hole 174 is further advantageous from the viewpoint of adjusting the flow rate of the irrigation liquid in the discharge rate adjusting part to a predetermined rate.

In addition, the configuration in which groove 175 is formed along the longer arc between hole 162 and second hole 174 of the circle around the edge of first hole 173 in plan view is further advantageous from the viewpoint of increasing the pressure drop of irrigation liquid in the discharge rate adjusting part under high outer liquid pressure. By increasing the pressure drop, the second set value can be further increased.

In addition, the configuration in which recess 171 further includes valve seat part 172 raised on the inside of groove 175 around first hole 173 is further advantageous from the viewpoint of further ensuring the closing of first hole 173 at the first set value.

In addition, the configuration in which the water intake part further includes the screen part including water intake slit 151 that opens to the interior of tube 110 is further advantageous from the viewpoint of preventing clogging of the channel of emitter 120 with floating matters in the irrigation liquid.

In addition, the configuration in which the discharging part further includes an intrusion preventing part for preventing intrusion of foreign matters into discharging port 112 is further advantageous from the viewpoint of preventing closing of the channel in emitter 120 and damaging of emitter 120 due to intrusion of the foreign matter.

In addition, the configuration in which emitter 120 is integrally molded with a resin material having flexibility is further advantageous from the viewpoint of enhancing the productivity of emitter 120 by facilitating assembly and increasing assembly precision.

In addition, drip irrigation tube 100 includes tube 110 including discharging port 112 for discharging irrigation liquid, and emitter 120 joined a at position corresponding to discharging port 112 on the inner wall surface of tube 110. Accordingly, drip irrigation tube 100 can control the discharge rate of the irrigation liquid at a desired rate in a wide range of the outer liquid pressure, for example, regardless of whether short irrigation or long irrigation, or regardless of the distance between water source emitter 120 and emitter 120.

Figure 7A:
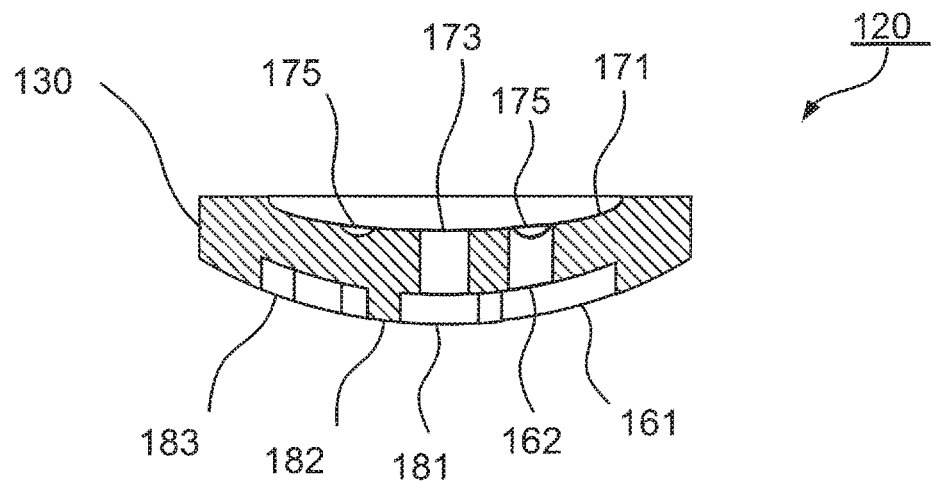
FIG. 7A illustrates a first modification of a discharge rate adjusting part of the emitter according to the first embodiment of the present invention.
Figure 7B:
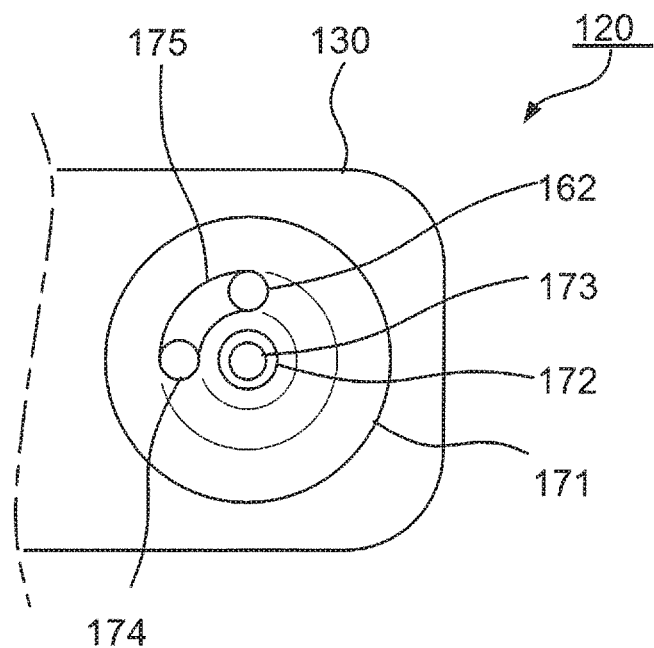
FIG. 7B illustrates a second modification of the discharge rate adjusting part.

It is to be noted that the discharge rate adjusting part may not include valve seat part 172 as illustrated in FIG. 7A. In addition, as illustrated in FIG. 7B, groove 175 may be formed along the shorter arc (whose center angle is 90°) between the supply port and second hole 174 of the circle.

Further, groove 175 may not communicate between hole 162 and second hole 174. For example, in the case where recess 171 is a columnar recess, by opening hole 162 and second hole 174 at the peripheral wall of the recess, hole 162 and second hole 174 can be disposed at positions where they are not sealed with diaphragm part 142 and can communicate with each other.

In addition, groove 175 may not be a round groove, and, for example, may be a rectangular groove in cross section.

The flow rate of the irrigation liquid in the groove can be further adjusted by the cross-sectional shape of the groove.

In addition, while each of first pressure reduction channel part 161 and second pressure reduction channel part 191 is composed of a groove having a zigzag shape in plan view, the length and planar shape thereof can be appropriately set as long as the pressure of the irrigation liquid flowing therethrough can be reduced to a desired value. For example, each of first and second pressure reduction channel parts 161 and 191 may be composed of any of various parts such as a narrow linear groove, a slit and a pore and combinations thereof which can define a channel capable of causing pressure drop of irrigation liquid.

Second Embodiment

Figure 8A:
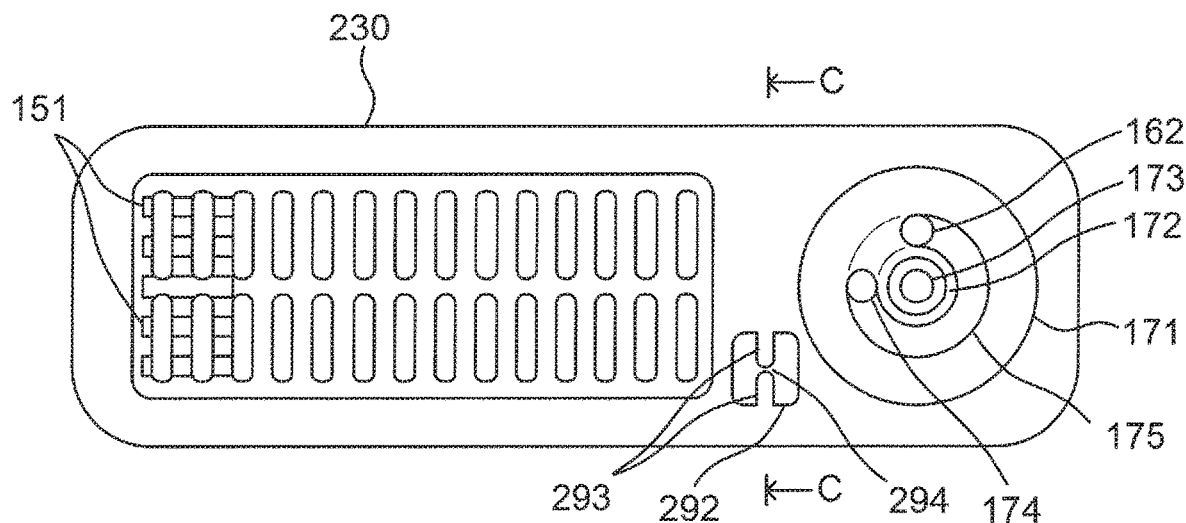
FIG. 8A is a plan view of an emitter main body of an emitter according to a second embodiment of the present invention.
Figure 8B:
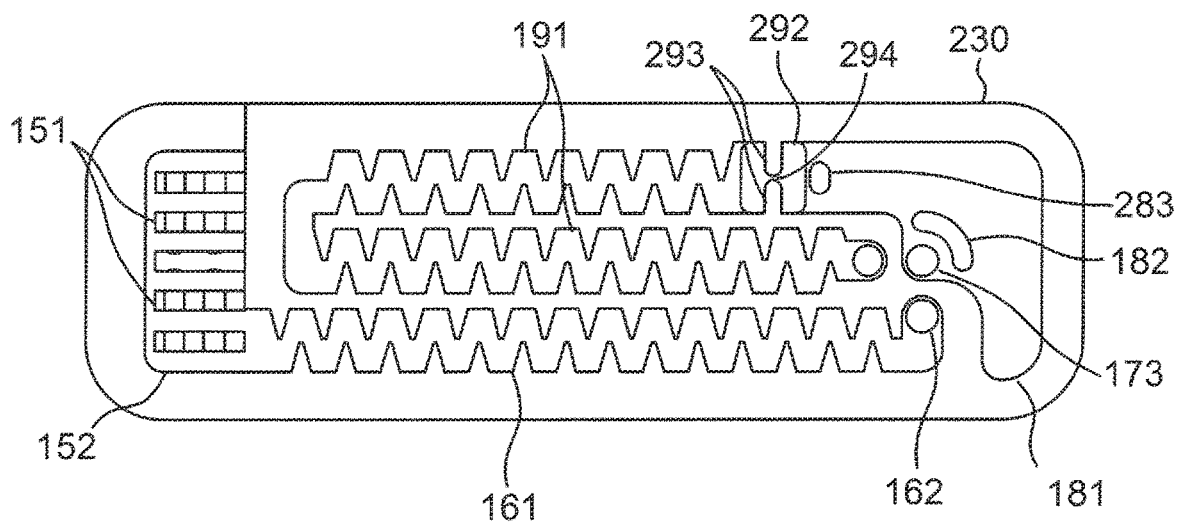
FIG. 8B is a bottom view of the emitter main body.
Figure 8C:
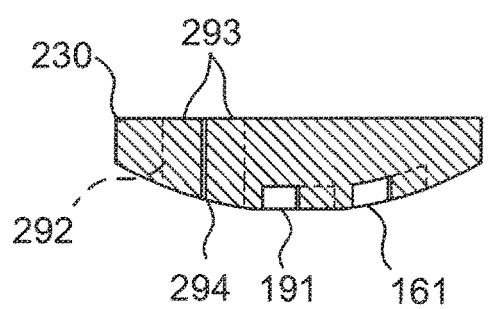
FIG. 8C is a cross-sectional view of the emitter main body of FIG. 8A taken along line C-C.

FIG. 8A to FIG. 8C illustrate an emitter according to the second embodiment of the present invention. FIG. 8A is a plan view of emitter main body 230 of the emitter according to the second embodiment of the present invention, FIG. 8B is a bottom view of emitter main body 230, and FIG. 8C is a cross-sectional view of emitter main body 230 taken along line C-C of FIG. 8A. As illustrated in FIG. 8A to FIG. 8C, the configuration of emitter main body 230 is roughly the same as that of emitter main body 130 except for a difference in configuration of the communication channel part.

Emitter main body 230 further includes hole 292 disposed between second pressure reduction channel part 191 and recess 181 so as to connect second pressure reduction channel part 191 and recess 181. The cross-sectional shape of hole 292 is a rectangular shape. Thin piece 293 protrudes from each of a pair of opposite walls of hole 292 in the short direction of emitter main body 230. The tip end portion of each thin piece 293 is chamfered, and a small gap is defined between the tip end portions. Thin piece 293 has flexibility, and the thickness of the base end portion of thin piece 293 is 0.4 mm, for example. The gap defines discharging slit 294 that communicates between second pressure reduction channel part 191 and recess 181. The width of discharging slit 294 is 0.1 mm, for example. The top surface of thin piece 293 is not joined to the film. Accordingly, the pair of thin pieces 293 can be opened and closed mainly at the upper part.

It is to be noted that second projection 283 is disposed such that a gap is provided between second projection 283 and the wall of recess 181 at a position where second projection 283 overlaps discharging slit 294 as viewed along the longitudinal direction of emitter main body 230.

The function of the emitter of the present embodiment is the same as that of emitter 120 except that the pressure drop of the communication channel further increases. With further increased pressure drop of the communication channel, the flow of irrigation liquid through the communication channel is further reduced, and, since the flow rate of the irrigation liquid in the channel is further reduced, the pressure (the second set value) which can be handled with the emitter can be further increased. Accordingly, in addition to the effects of emitter 120, the emitter is further advantageous from the viewpoint of prioritizing first hole 173 in carrying the irrigation liquid when the outer liquid pressure is low, and from the viewpoint of setting the second set value to a value higher than that of emitter 120.

In addition, with the emitter of the present embodiment, floating matters reaching discharging slit 294 are surely discharged to the discharging part by thin pieces 293 having flexibility.

Third Embodiment

Figure 9A:
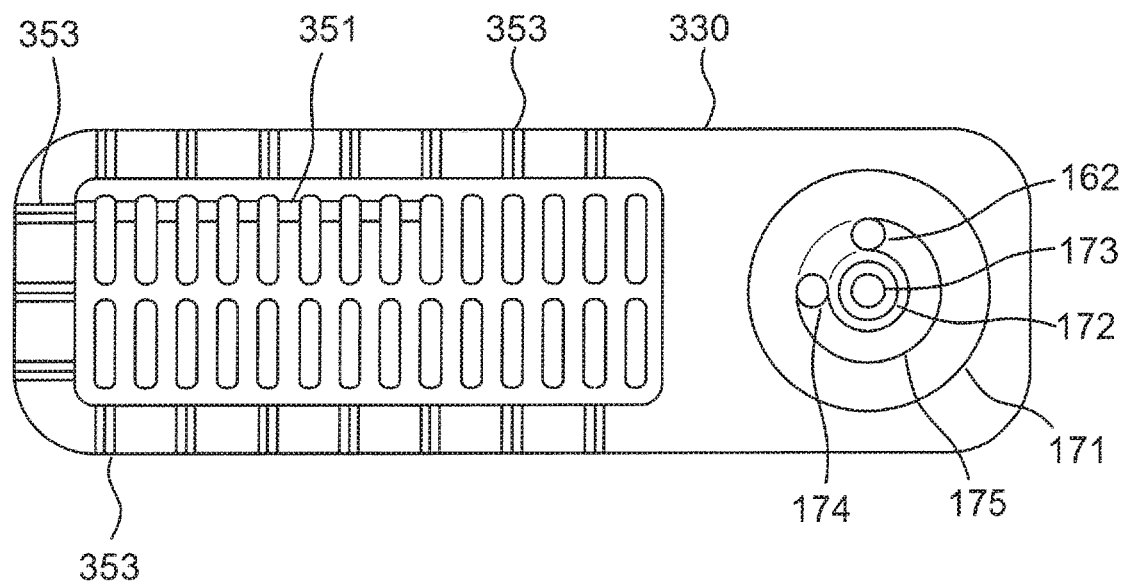
FIG. 9A is a plan view of an emitter main body of an emitter according to a third embodiment of the present invention.
Figure 9B:
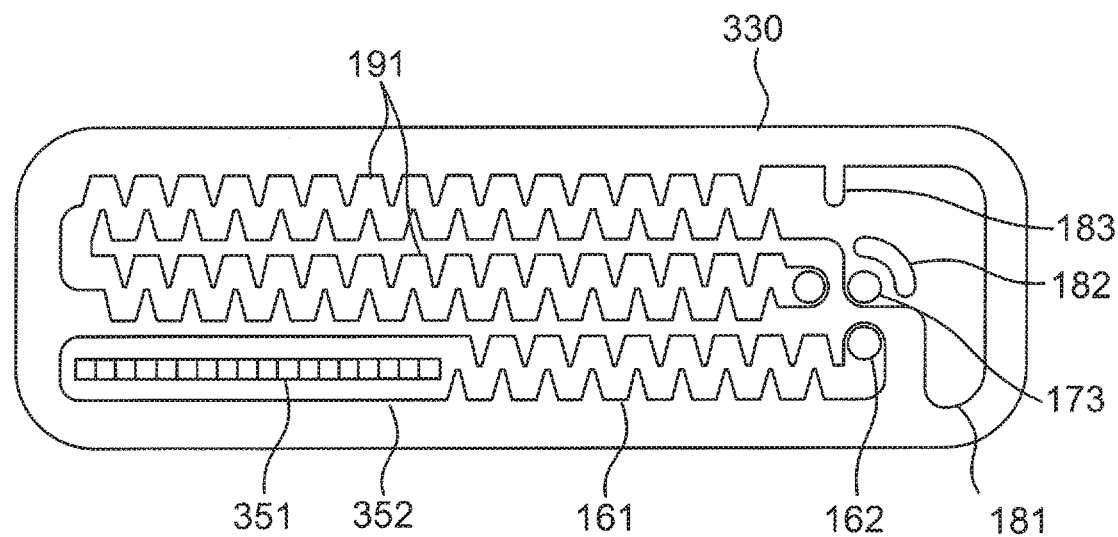
FIG. 9B is a bottom view of the emitter main body.
Figure 10A:
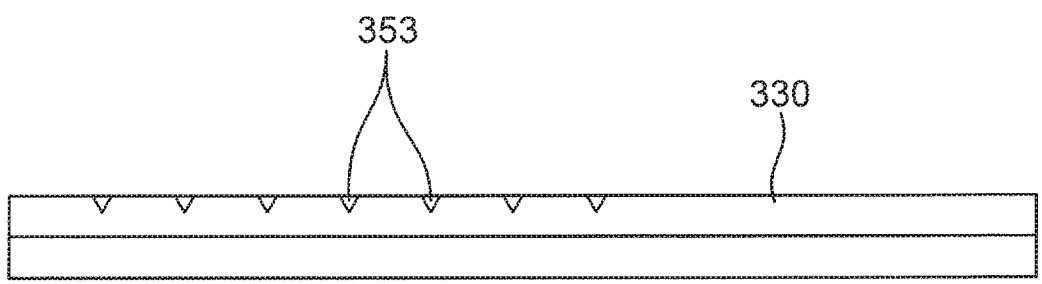
FIG. 10A is a front view of the emitter main body of the third embodiment of the present invention.
Figure 10B:
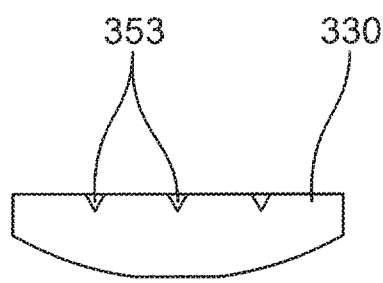
FIG. 10B is a left side view of the emitter main body.

FIG. 9A, FIG. 9B, FIG. 10A and FIG. 10B illustrate an emitter according to the third embodiment of the present invention. FIG. 9A is a plan view of emitter main body 330 of the emitter according to the present embodiment, and FIG. 9B is a bottom view of emitter main body 330. In addition, FIG. 10A is a front view of emitter main body 330, and FIG. 10B is a left side view of emitter main body 330. The configuration of emitter main body 330 is the same as that of emitter main body 130 except for a difference in the configuration of the water intake part.

First, as illustrated in FIG. 9A, emitter main body 330 includes a plurality of grooves 353 on the outer periphery part around the screen part on the top surface of emitter main body 330. Grooves 353 cross the outer periphery part. As illustrated in FIG. 10A and FIG. 10B, each groove 353 is a V-shaped groove, and, for example, has a depth of 0.35 mm and a width of 0.4 mm.

In addition, emitter main body 330 includes water intake slit 351 and recess 352. As illustrated in FIG. 9A, one water intake slit 351 is disposed at one side part of emitter main body 330 along the longitudinal direction of emitter main body 330. Water intake slit 351 extends across the second grooves and opens to the second grooves.

As illustrated in FIG. 9B, recess 352 is disposed at one side part of emitter main body 330 along the longitudinal direction of emitter main body 330 as with water intake slit 351. First pressure reduction channel part 161 is continuously connected with the other end of recess 352 in the longitudinal direction. Accordingly, the length of first pressure reduction channel part 161 is smaller than that of emitter 120. On the other hand, the length of second pressure reduction channel part 191 is about twice the sum of the lengths of recess 352 and first pressure reduction channel part 161, that is, the length of second pressure reduction channel part 191 is greater than that of emitter 120.

With the emitter of the present embodiment, even when the top surface of the emitter is sealed with a relatively large floating matter (for example, such as a fallen leaf), the irrigation liquid is supplied to water intake slit 351 through groove 353. Accordingly, in addition to the effects of emitter 120, the emitter is further advantageous from the viewpoint of ensuring the channel for the irrigation liquid in the water intake part.

In addition, in the emitter, the length of first pressure reduction channel part 161 is short. Accordingly, the emitter is further advantageous from the viewpoint of setting the first set value to a value lower than that of emitter 120. Further, in the emitter, the length of second pressure reduction channel part 191 is long. Accordingly, the emitter is further advantageous from the viewpoint of setting the second set value to a value higher than that of emitter 120.

Fourth Embodiment

Figure 11A:
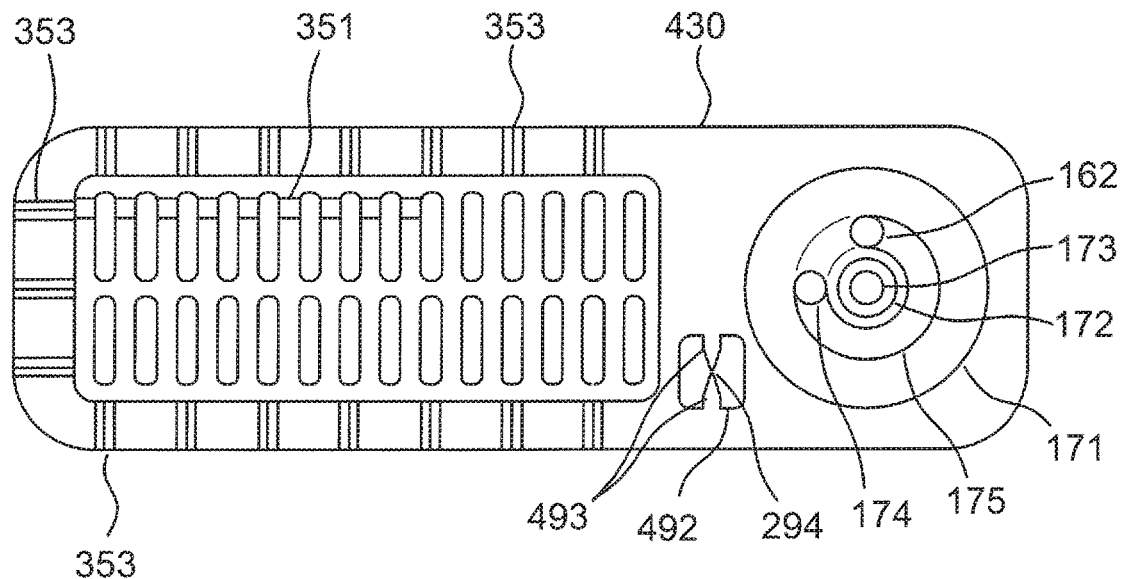
FIG. 11A is a plan view of an emitter main body of an emitter according to a fourth embodiment of the present invention.
Figure 11B:
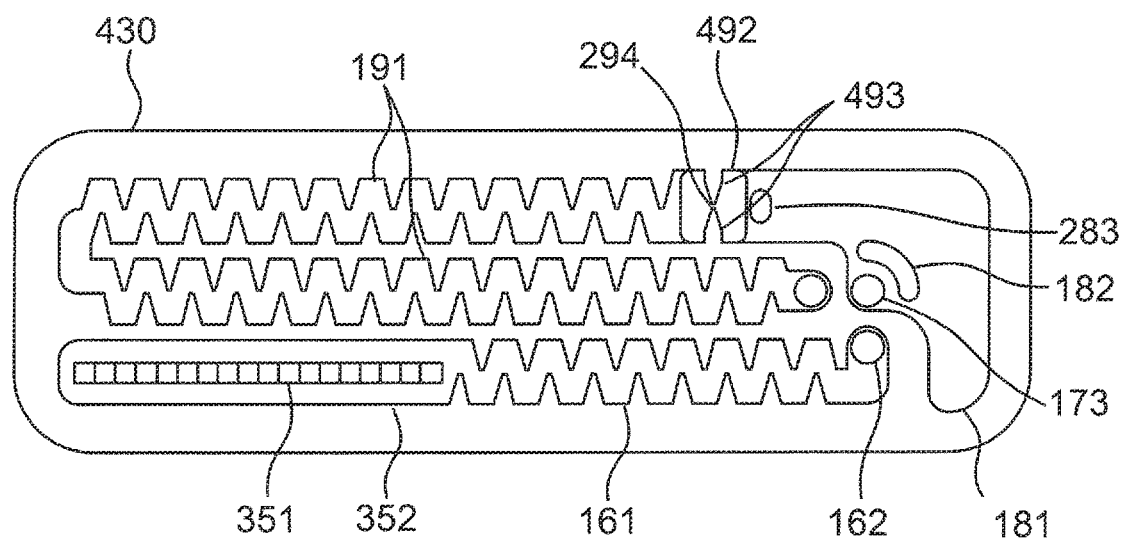
FIG. 11B is a bottom view of the emitter main body.

FIG. 11A and FIG. 11B illustrate an emitter according to the fourth embodiment of the present invention. FIG. 11A is a plan view of emitter main body 430 of the emitter according to the present embodiment, and FIG. 11B is a bottom view of emitter main body 430. The configuration of emitter 430 is the same as that of emitter main body 330 except for a difference in configuration of the communication channel part.

As illustrated in FIG. 11A and FIG. 11B, emitter main body 430 further includes hole 492 disposed between second pressure reduction channel part 191 and recess 181 so as to connect second pressure reduction channel part 191 and recess 181. The cross-sectional shape of hole 492 is a rectangular shape. Thin piece 493 protrudes from each of the opposite walls of hole 492 in the short direction of emitter main body 460. The configuration of each thin piece 493 is the same as that of thin piece 293 except that the width of the tip end portion of thin piece 493 is gradually reduced toward the tip in plan view. In addition, the second projection is disposed in the same manner as that of emitter main body 230.

The function of the emitter of the present embodiment is the same as that of the emitter of the third embodiment except that the pressure drop of the communication channel is further increased as with the emitter of the second embodiment. Accordingly, the emitter of the present embodiment achieves the effects of the emitters of the second and third embodiments. It should be noted that thin piece 493 is more easily opened and closed than thin piece 293. Accordingly, the emitter of the present embodiment is further advantageous in comparison with the emitter of the second embodiment from a view point of preventing clogging.

This application is entitled to and claims the benefit of Japanese Patent Application No. 2015-110554 dated May 29, 2015, the disclosure of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the emitter in the technical fields of drip irrigations and endurance tests where long-term dropping is required, and development in the technical fields can be expected.

REFERENCE SIGNS LIST

100 Drip irrigation tube
110 Tube
112 Discharging port
120 Emitter
130, 230, 330, 430 Emitter main body
140 Film
141 Hinge part
142 Diaphragm part
151, 351 Water intake slit
152, 171, 181, 352 Recess
161 First pressure reduction channel part
162, 292, 492 Hole
172 Valve seat part
173 First hole
174 Second hole
175, 353 Groove
182 First projection
183, 283 Second projection
191 Second pressure reduction channel part
293, 493 Thin piece
294 Discharging slit

The invention claimed is:

1. An emitter configured to be joined on an inner wall surface of a tube for carrying irrigation liquid at a position corresponding to a discharging port communicating between inside and outside of the tube, the emitter being configured to quantitatively discharge the irrigation liquid in the tube from the discharging port to the outside of the tube, the emitter comprising:
a water intake part for intake of the irrigation liquid in the tube;
a first pressure reduction channel part forming a first pressure reduction channel configured to allow the irrigation liquid received at the water intake part to flow therethrough while reducing a pressure of the irrigation liquid received at the water intake part;
a discharge rate adjusting part for controlling a flow rate of the irrigation liquid supplied from the first pressure reduction channel in accordance with a pressure of the irrigation liquid in the tube;
a discharging part for housing the irrigation liquid supplied from the discharge rate adjusting part, the discharging part being configured to face the discharging port; and
a communication channel part configured to communicate between the discharge rate adjusting part and the discharging part, wherein:
the discharge rate adjusting part includes:
a recess,
a film having flexibility, the film being disposed such that the film is separated from the recess and is capable of making contact with the recess when the pressure of the irrigation liquid in the tube is equal to or greater than a set value,
a supply port communicated with the first pressure reduction channel part and configured to supply the irrigation liquid to the recess,
a first hole opening at the recess and the discharging part and configured to be sealed with the film when the film makes contact with the recess,
a second hole opening at the communication channel part and at a position where the second hole is communicated with the supply port when the film seals the first hole, and
a groove formed on a surface of the recess and configured to directly communicate between the supply port and the second hole,
the communication channel part includes a second pressure reduction channel part forming a second pressure reduction channel configured to allow the irrigation liquid to flow therethrough while reducing the pressure of the irrigation liquid,
the groove is formed along a longer arc of two arcs of a curved shape that extends from the supply port to the second hole around an edge of the first hole, and
each of the two arcs extending between the supply port and the second hole.

2. The emitter according to claim 1, wherein the communication channel part further includes an openable and closable discharging slit formed of a pair of thin pieces having flexibility, the pair of thin pieces facing each other at a position between the second pressure reduction channel part and the discharging part.

3. The emitter according to claim 1, wherein the water intake part further includes a screen part including a water intake slit configured to be open to the inside of the tube.

4. The emitter according to claim 1, wherein the discharging part further includes an intrusion preventing part for preventing intrusion of foreign matters from the discharging port.

5. The emitter according to claim 1, wherein the emitter is integrally molded with a resin material having flexibility.

6. A drip irrigation tube comprising:
the tube including the discharging port for discharging irrigation liquid; and
the emitter according to claim 1 joined on the inner wall surface of the tube at a position corresponding to the discharging port.

\* \* \* \* \*